United States Patent
Guo et al.

(10) Patent No.: US 11,238,729 B1
(45) Date of Patent: Feb. 1, 2022

(54) SYSTEMS AND METHODS FOR TRAFFIC FLOW PREDICTION

(71) Applicant: Toyota Motor Engineering & Manufacturing North America, Inc., Plano, TX (US)

(72) Inventors: Rui Guo, San Jose, CA (US); Hongsheng Lu, San Jose, CA (US); Ahmed H. Sakr, Mountain View, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/018,678

(22) Filed: Sep. 11, 2020

(51) Int. Cl.
*G08G 1/09* (2006.01)
*G08G 1/01* (2006.01)
*G06N 3/08* (2006.01)

(52) U.S. Cl.
CPC ........... *G08G 1/0133* (2013.01); *G06N 3/084* (2013.01); *G08G 1/0112* (2013.01)

(58) Field of Classification Search
CPC ..... G08G 1/0133; G08G 1/0112; G06N 3/084
USPC ........................................................ 340/905
See application file for complete search history.

(56) References Cited

U.S. PATENT DOCUMENTS 7,747,381 B2   6/2010  Adachi
8,103,435 B2   1/2012  Yang et al.
9,257,041 B2   2/2016  Scofield et al.
9,286,793 B2   3/2016  Pan et al.
(Continued)

FOREIGN PATENT DOCUMENTS

CN    104134351 A    11/2014
CN    106295874 A    1/2017
(Continued)

OTHER PUBLICATIONS

Zhao et al., "T-GCN: A Temporal Graph Convolutional Network for Traffic Prediction," 11 pages, arXiv:1811.05320v3 [cs.LG] Dec. 31, 2018.
(Continued)

*Primary Examiner* — Kerri L McNally
*Assistant Examiner* — Thang D Tran
(74) *Attorney, Agent, or Firm* — Christopher G. Darrow; Darrow Mustafa PC (57) ABSTRACT

A method of generating a traffic prediction includes receiving traffic data from a plurality of reporting sources, forming a plurality of initial graphs, generating a plurality of completed graphs based on the plurality of initial graphs by at least removing noise from the plurality of initial graphs, generating a plurality of feature vectors that represent spatial relationships and temporal relationships in the plurality of completed graphs, outputting a first feature vector corresponding to a first time window as a first output, caching a copy of the first feature vector with a set of feature vectors of the plurality of feature vectors corresponding to a second time window, connecting the first feature vector with the set of feature vectors, outputting the result as a second output, fusing the first output with the second output and generating a traffic prediction based on the fused outputs.

20 Claims, 6 Drawing Sheets

(56) References Cited

U.S. PATENT DOCUMENTS

| | | | | |
|---|---|---|---|---|
| 2006/0064233 A1* | 3/2006 | Adachi | G08G 1/0104 | |
| | | | 701/117 | |
| 2008/0215233 A1* | 9/2008 | Adachi | G08G 1/0104 | |
| | | | 701/118 | |
| 2009/0043486 A1* | 2/2009 | Yang | G01C 21/3492 | |
| | | | 701/117 | |
| 2011/0106416 A1* | 5/2011 | Scofield | G08G 1/0104 | |
| | | | 701/119 | |
| 2014/0114556 A1* | 4/2014 | Pan | G08G 1/0112 | |
| | | | 701/119 | |
| 2017/0124863 A1* | 5/2017 | Dumazert | G08G 1/0133 | |
| 2018/0003516 A1* | 1/2018 | Khasis | G08G 1/20 | |
| 2018/0089994 A1* | 3/2018 | Dhondse | G08G 1/0145 | |
| 2018/0096595 A1* | 4/2018 | Janzen | G06K 9/0063 | |
| 2018/0300565 A1* | 10/2018 | Qin | B60W 30/00 | |
| 2019/0147331 A1* | 5/2019 | Arditi | G05D 1/0274 | |
| | | | 706/20 | |
| 2019/0180612 A1* | 6/2019 | Demiryurek | G01C 21/20 | |
| 2020/0152056 A1* | 5/2020 | Zhang | G08G 1/0145 | |
| 2020/0284883 A1* | 9/2020 | Ferreira | G01S 7/4816 | |
| 2020/0365015 A1* | 11/2020 | Nguyen | G08G 1/0133 | |
| 2021/0049900 A1* | 2/2021 | Chang | G08G 1/0112 | |
| 2021/0118288 A1* | 4/2021 | Kalabic | G08G 1/081 | |

FOREIGN PATENT DOCUMENTS

| | | | |
|---|---|---|---|
| CN | 107103758 | * | 8/2017 |
| CN | 107103758 A | | 8/2017 |

OTHER PUBLICATIONS

Guo et al., "Attention Based Spatial-Temporal Graph Convolutional Networks for Traffic Flow Forecasting," The Thirty-Third AAAI Conference on Artificial Intelligence (AAAI-19), pp. 922-929 (2019).

* cited by examiner

SYSTEMS AND METHODS FOR TRAFFIC FLOW PREDICTION

TECHNICAL FIELD

The subject matter described herein relates to systems and methods for predicting traffic flow, and, more particularly, to predicting traffic flow based on modeling traffic information in graph form, disentangling spatial and temporal relations, and considering different temporal granularities implemented by delayed sampling.

BACKGROUND

Increasing numbers of vehicles, particularly in and around urban areas, increases traffic congestion in patterns that may be cyclic in nature. An intelligent transportation system (ITS) in urban settings can inform users about traffic patterns and enable safer, more coordinated, and more efficient use of transport networks, roads, highways. An ITS preferably uses accurate and real-time traffic flow data to provide traffic insights to transportation participants. However, traffic flow data collected by fixed detectors is normally subject to high noise and missing data segments due to, for example, mechanical failure of detectors or malfunction in information transmission. Thus, conventional deployment of traffic detectors and monitoring equipment in large-scale on metropolitan road networks often results in incomplete, and therefore inaccurate, traffic data which is insufficient for supporting an effective ITS.

SUMMARY

In one embodiment, example systems and methods associated with predicting traffic flows by collecting traffic data from multiple sources, modeling the data in graph form, and processing the graph form to generate traffic flow predictions are disclosed.

For example, a traffic flow prediction system is disclosed. In one approach, the disclosed system includes a communication device configured to continually receive traffic data from a plurality of reporting sources, the traffic data being associated with roads in a geographic area and indicating reported information about the roads, one or more processors and a memory communicably connected to the one or more processors. The memory can store an aggregation module including one or more instructions that, when executed by the one or more processors, cause the one or more processors to form a plurality of initial graphs each created by fusing the traffic data received over first lengths of time, and an encoder module including one or more instructions that, when executed by the one or more processors, cause the one or more processors to generate a plurality of completed graphs based on the plurality of initial graphs by at least removing noise from the plurality of initial graphs, and to generate a plurality of feature vectors that represent spatial relationships and temporal relationships in the plurality of completed graphs.

The memory can further store a sampling module including one or more instructions that, when executed by the one or more processors, cause the one or more processors to output a first feature vector of the plurality of feature vectors corresponding to a first time window as a first output, cache a copy of the first feature vector with a set of feature vectors of the plurality of feature vectors corresponding to a second time window, connect the first feature vector with the set of feature vectors and output the result as a second output, where the second time window is longer than the first time window, and a prediction module including one or more instructions that, when executed by the one or more processors, cause the one or more processors to fuse the first output with the second output and generate a traffic prediction based on the fused outputs.

In one embodiment a method of predicting traffic flow is disclosed. The method includes receiving traffic data from a plurality of reporting sources, the traffic data being associated with roads in a geographic area and indicating reported information about the roads, forming a plurality of initial graphs, each created by fusing the traffic data received over first lengths of time, generating a plurality of completed graphs based on the plurality of initial graphs by at least removing noise from the plurality of initial graphs, generating a plurality of feature vectors that represent spatial relationships and temporal relationships in the plurality of completed graphs, outputting a first feature vector of the plurality of feature vectors corresponding to a first time window as a first output, caching a copy of the first feature vector with a set of feature vectors of the plurality of feature vectors corresponding to a second time window, connecting the first feature vector with the set of feature vectors, outputting the result as a second output, where the second time window is longer than the first time window, fusing the first output with the second output, and generating a traffic prediction based on the fused outputs.

In one embodiment, a non-transitory computer-readable medium is disclosed. The computer-readable medium stores instructions that when executed by one or more processors cause the one or more processors to perform the functions disclosed herein related to predicting traffic flow. The instructions include instructions to receive traffic data from a plurality of reporting sources, the traffic data being associated with roads in a geographic area and indicating reported information about the roads, form a plurality of initial graphs, each created by fusing the traffic data received over first lengths of time, generate a plurality of completed graphs based on the plurality of initial graphs by at least removing noise from the plurality of initial graphs, generate a plurality of feature vectors that represent spatial relationships and temporal relationships in the plurality of completed graphs, output a first feature vector of the plurality of feature vectors corresponding to a first time window as a first output, cache a copy of the first feature vector with a set of feature vectors of the plurality of feature vectors corresponding to a second time window, connect the first feature vector with the set of feature vectors, output the result as a second output, where the second time window is longer than the first time window, fuse the first output with the second output, and generate a traffic prediction based on the fused outputs.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and embodiments associated with predicting traffic flow are disclosed. Herein, the term "traffic flow" refers to characteristics of traffic related to and indicating movement and density.

In one or more embodiments, the disclosed traffic flow prediction system can be implemented as a cloud server that receives traffic information from a plurality of reporting sources, such as sensor rich vehicles (SRVs) and road-side units (RSUs). As used herein, an SRV is defined as a network-connected vehicle equipped with multiple sensors, e.g. camera, radar, LIDAR, etc., that can proactively sense aspects of a surrounding environment, for example, detect objects of interest, keep count of detections, and measure or calculate traffic dynamics, such as traffic speed, flow rates, density/occupancy. An SRV can aggregate sensor data into a message, i.e., a traffic data report, which the SRV can transmit to the cloud server implementing the disclosed traffic flow prediction system.

An RSU, as referred to herein, is equipped similarly to an SRV and can similarly detect traffic related information from a stationary position, such as at a road network intersection, and similarly transmit one or more periodic traffic data reports to the cloud server. By receiving traffic data reports from a mixture of SRVs and RSUs the disclosed traffic flow prediction system can diversify and increase coverage for a given geographic area.

Figure 1:
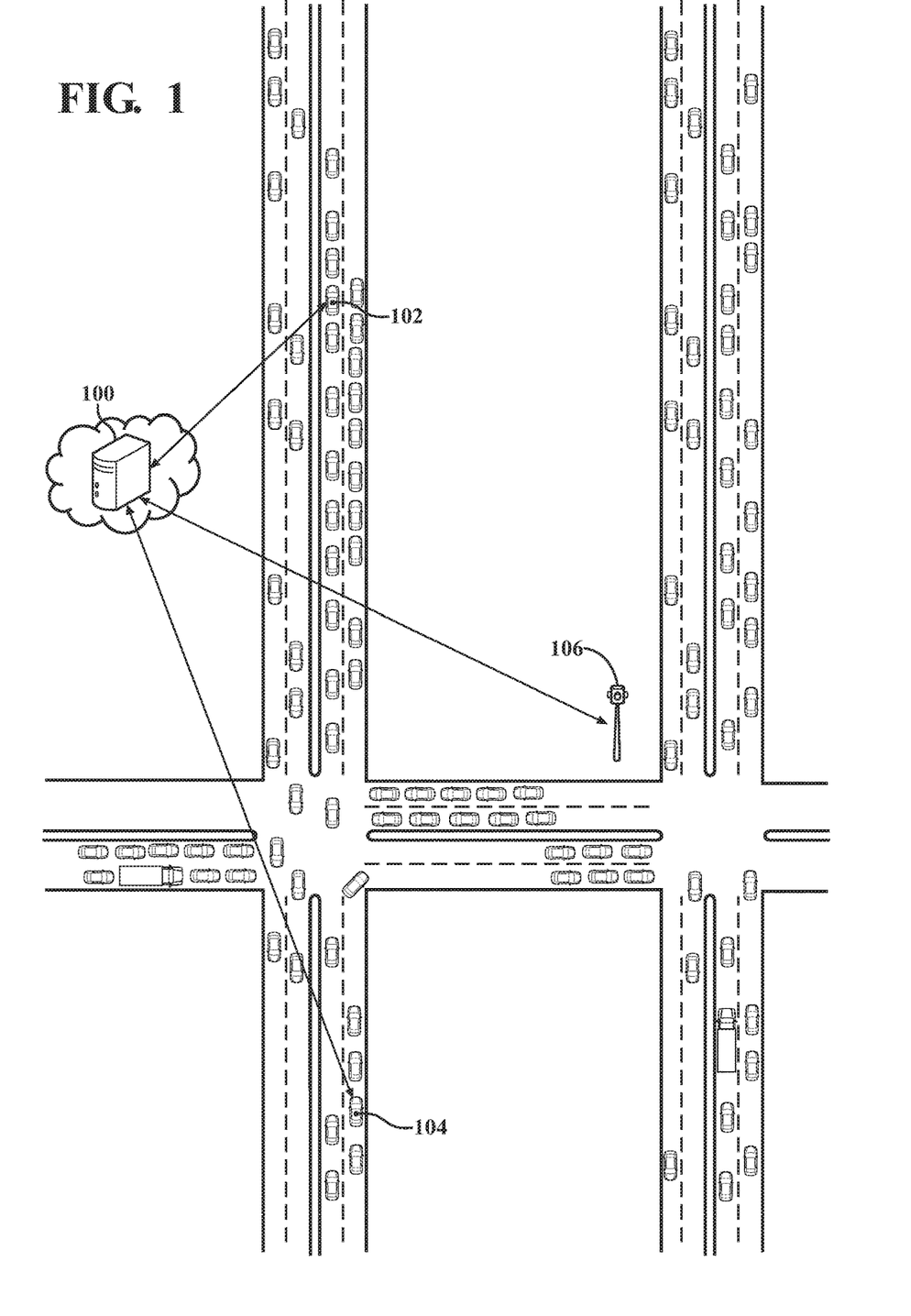
FIG. 1 illustrates one embodiment of a general network structure of a traffic flow prediction system according to the disclosed subject matter.

FIG. 1 shows an example general network structure of a traffic flow prediction system 100 according to the disclosed embodiments. The traffic flow prediction system 100 can be implemented, for example, as a cloud server configured to wirelessly communicate with multiple reporting entities, such as SRVs 102, 104 and RSU 106, through, for example, V2X (vehicle-to-everything), edge-to-cloud communication protocols or other wireless communication protocols.

The reporting entities (i.e., SRVs 102, 104, RSU 106, etc.) can individually process and aggregate sensor data to compute traffic data, such as traffic speed, flow rate, density, etc. In one or more embodiments, the reporting entities can frame the traffic data with a timestamp and location information (e.g., geo-location and direction) at a certain frequency. For example, the traffic flow prediction system 100 can determine a framing frequency based on a refreshing frequency of each sensor as the computation time. In one or more embodiments, the traffic flow prediction system 100 can be designed to provide 10 hz updating rates, or other rates as required, for example, by a local intelligent transportation system (ITS).

In one or more embodiments, the reporting entities can also determine confidence scores to assign to reported traffic data. The confidence scores can be based on and/or reflect, for example, sensor quality, lighting conditions, environmental conditions, and visual occlusions in the environment around the reporting entity. Thus, for example, a reporting entity may assign a relatively high confidence score to a traffic information report that is obtained on a clear day on an open highway with light traffic and few occlusions, while a the reporting entity may assign a relatively low confidence score to a traffic information report obtained on a snowy day with low visibility in heavy traffic.

The traffic flow prediction system 100 receives traffic data reports from the reporting entities over varying periods of time and aggregates the data to reduce redundancies in reports. For example, the system 100 may receive a plurality of reports from reporting entities associated with a substantially same area (e.g., geo-location and direction) at a substantially same time (e.g., timestamp within a minimum threshold difference) and select a single representative report (e.g., a report having a highest confidence score) from among the plurality of reports as part of the aggregation process. In one or more embodiments, the traffic flow prediction system 100 fuses the traffic data reports into a graph data-structure, taking into account assigned confidence scores, and normalizes the fusion results.

Figure 2:
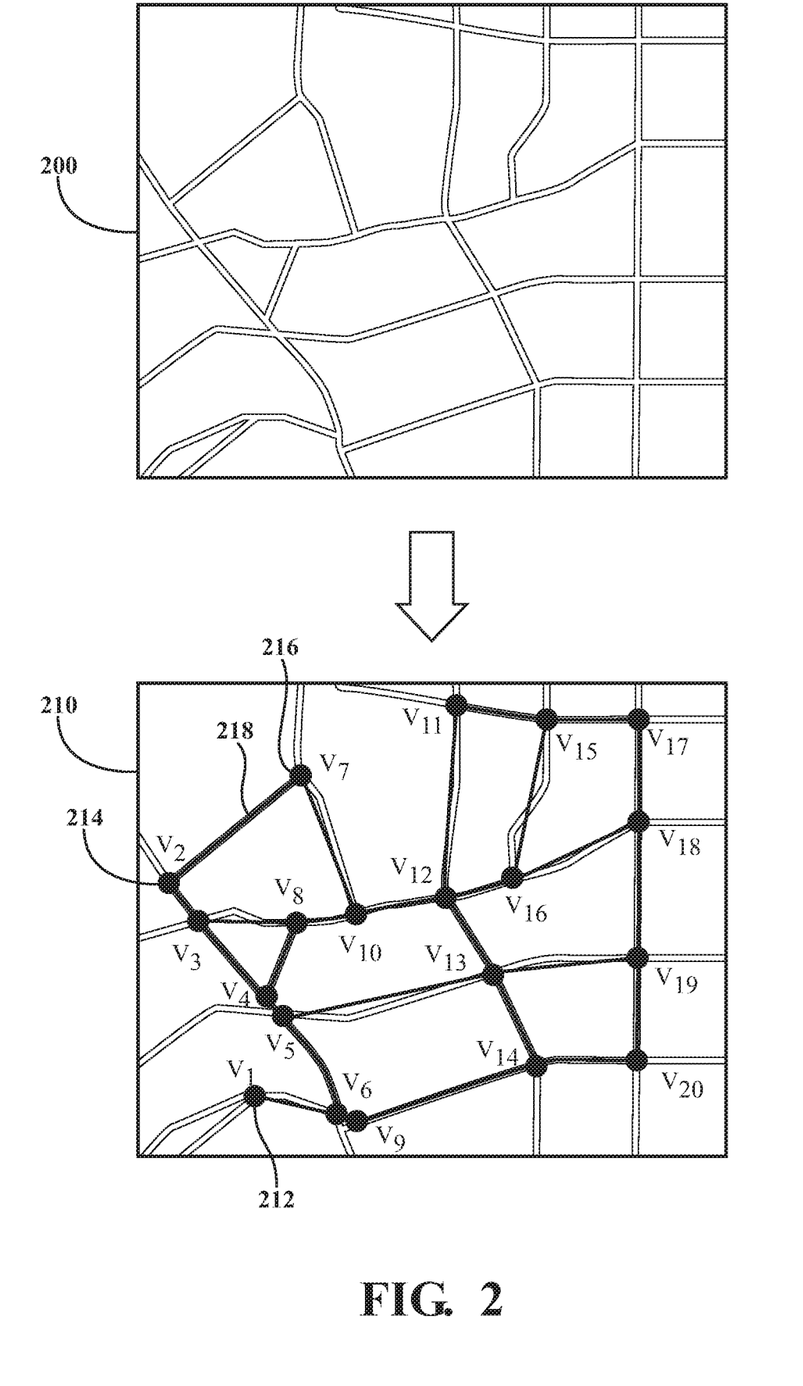
FIG. 2 illustrates an example an example of a road network converted into a graph according to the disclosed subject matter.

In creating the graph data-structure, the traffic flow prediction system 100 combines the traffic data reports with data indicating the physical road network corresponding to the traffic reports. FIG. 2 illustrates an example of a road network 200 converted into a graph 210, wherein road intersections are represented by vertices (e.g., V1 212, V2 214, etc.) and road links between intersections are represented by edges between the vertices. For example, road link 218 connects vertices V2 214 and V7 216, and so on. A "vertex" as used herein refers to either an intersection or a pre-defined location on a road segment, such as a highway, that is designated as a significant point. For example, a lengthy highway may include one or more vertices at exit points or other significant points which thereby divide the highway into segments.

In one or more embodiments, the SRVs do not transmit a traffic data report from a road link between intersections or other pre-defined significant points (e.g., vertices V1-V20). Instead, an SRV will only transmit a traffic data report when it is at or near an intersection or other pre-defined significant point. Accordingly, the traffic data reports can be associated with corresponding vertices in the graph. The traffic information represented in the traffic data reports (e.g., speed, flow rate, density) can each be characterized as features associated with the vertices, which may be represented as a k-dimension vector.

In one or more embodiments, the graph is denoted as a matrix G having dimensions N×k, where N is the total number of vertices, and k is the feature vector associated with each vertex. The traffic flow prediction system 100 can describe connection relations between vertices as an adjacent matrix A having dimensions N×N. In one or more embodiments, the adjacent matrix A is a binary matrix, where $A_{ij}=1$ represents vertex i connected with vertex j, and the adjacent matrix A is directional, since the road link has one-way traffic or two-way. In this case, $A_{ij} \neq A_{ji}$.

In one or more embodiments, the traffic flow prediction system 100 can also create an edge matrix E having dimensions N×N×l. The traffic flow prediction system 100 can construct the edge matrix E to include road link attributes which represent aspects of roads (i.e., corresponding to edges), such as a speed limit of the link, maximum value of the road curvature with the dimension l, and an indicator of a traffic incident in the link. The attributes can be characterized as indicating an easiness or difficulty level of driving on a particular road link.

Thus, the graph-structured data G, A and E describe the traffic information and the geometry of the road network. Generally, the A and E matrices are fixed information once the road network is created, with the exception of the E matrix possibly including transient data that indicates a currently existing traffic incident (e.g., an accident, a car pulled over, construction blockage, etc.). The G matrix represents sensed information reported by reporting entities and may contain noise and missing value if a given vertex area does not have an associated report from a reporting entity (e.g., no SRV passed the intersection during a given time frame). The traffic flow prediction system 100 can clean and complete the G matrix traffic information by applying a machine learning algorithm based on graph-structured data.

Figure 3:
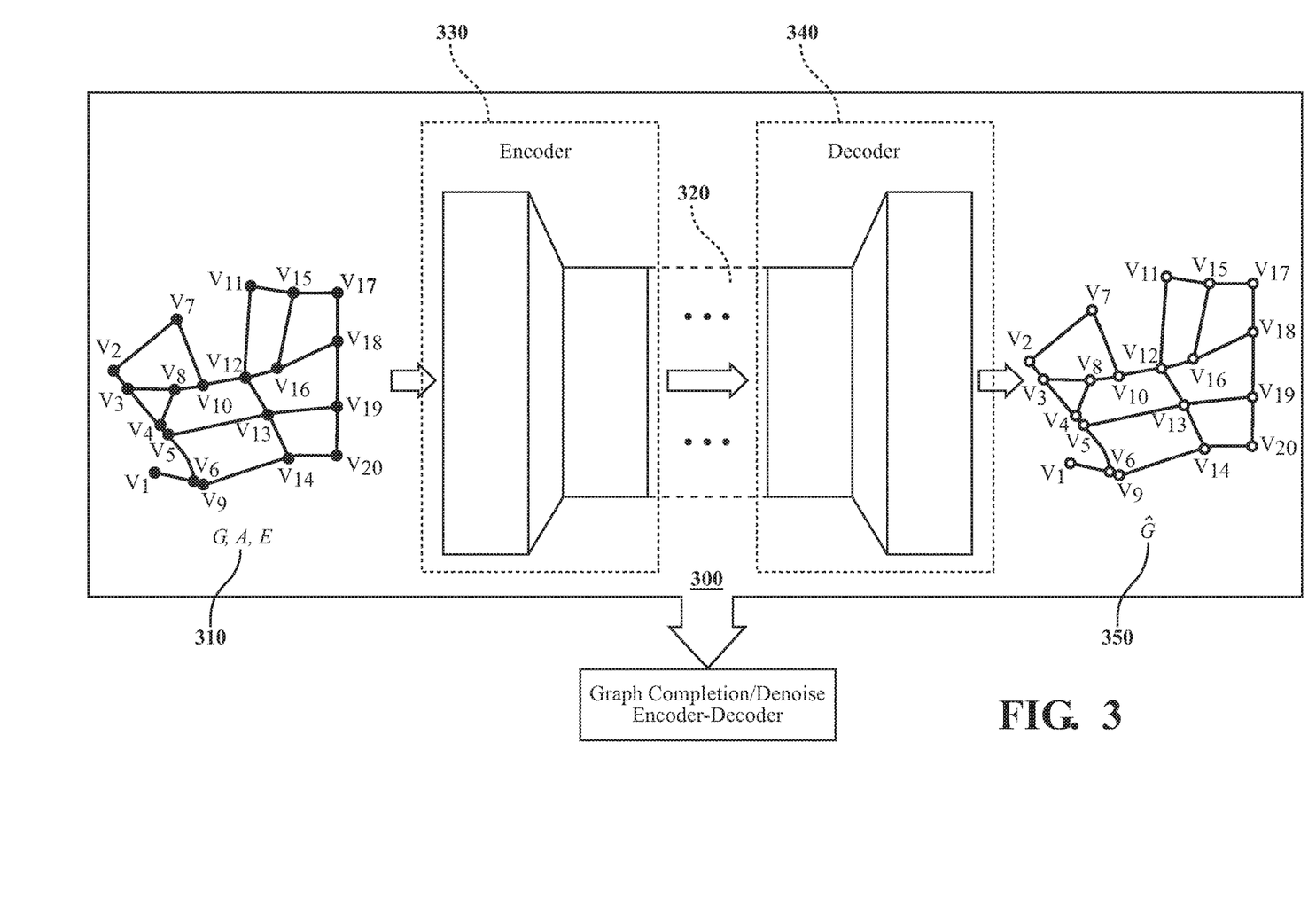
FIG. 3 illustrates an example an example generative neural network according to the disclosed subject matter.

In one or more embodiments, the traffic flow prediction system 100 can utilize a novel generative neural network model with an encoder-decoder structure. FIG. 3 illustrates an example generative neural network 300 according to the disclosed embodiments. In one or more embodiments, the generative neural network 300 could be implemented as a variational graph convolution network or graph convolutional generative adversarial network (GAN).

In the encoding processing, the generative neural network 300 receives the G, A and E matrices as inputs 310, maps the high dimensional graph data multiple times non-linearly to a latent space 320 (i.e., a lower-dimensional space than the input space) through encoder 330 (e.g., a layered neural network), and then, through inverse decoding, a decoder 340 re-projects the information back to the original dimension space as a reconstructed graph $\hat{G}$ 350.

In one or more embodiments, in a training stage, the generative neural network 300 can reference a clean and completed ground truth graph $\tilde{G}$. By minimizing an error $|\hat{G}-\tilde{G}|$ and back-propagating the derivate, the generative neural network 300 can update parameter weights to reach a stable point. After training the generative neural network 300 has the capability to generate a more accurate reconstructed graph $\hat{G}$ 350 closer to the correct clean and completed values.

The traffic flow prediction system 100 can further process the reconstructed graph $\hat{G}$ 350 of the traffic information using a machine learning structure to predict future dynamics in the road network. Generally, traffic information is highly correlated in spatial and temporal space. To solve the dynamic prediction problem, one or more of the disclosed embodiments can utilize a processing framework that can consider different temporal granularities by utilizing delayed sampling.

Figure 4:
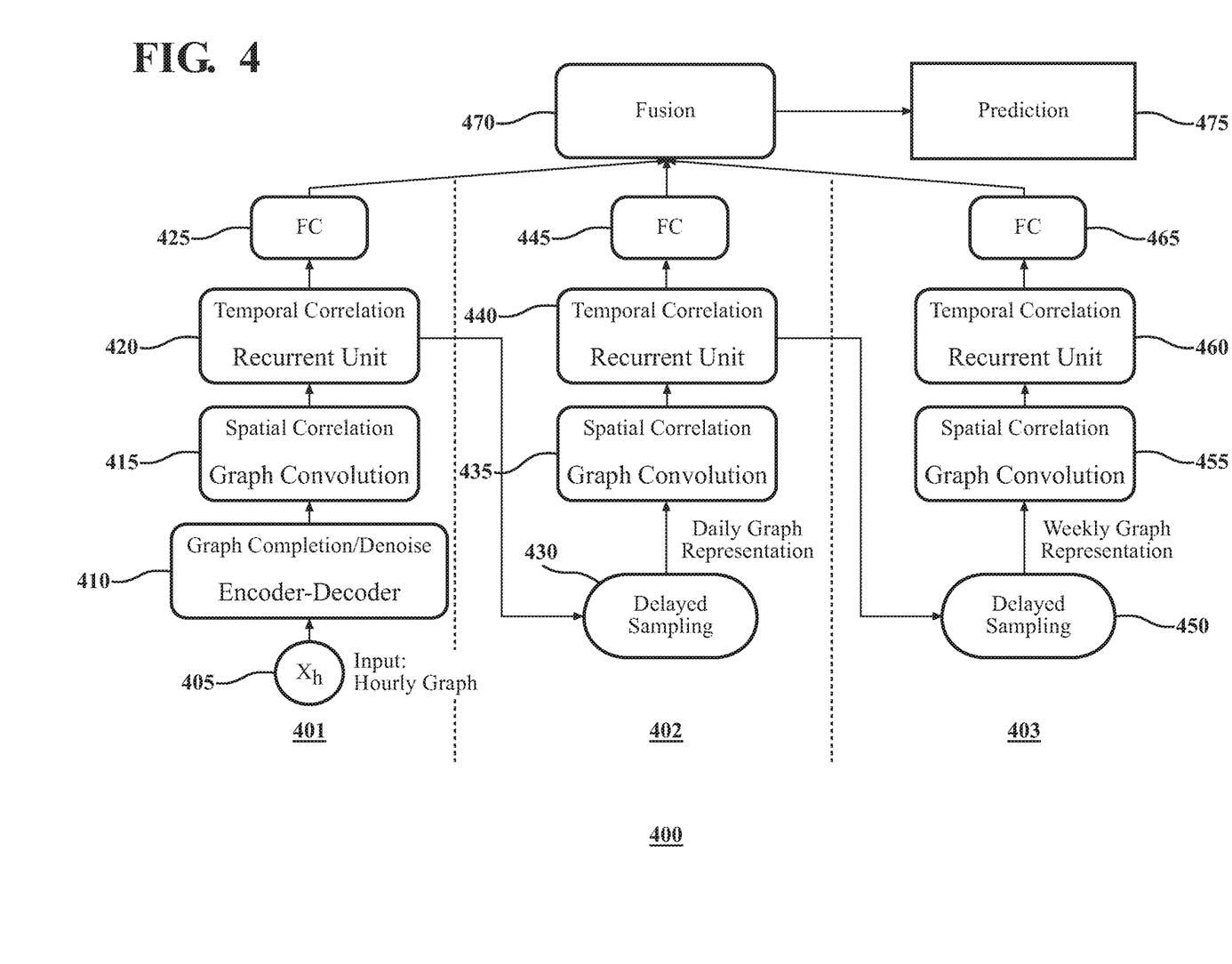
FIG. 4 illustrates an example delayed sampling processing framework according to the disclosed subject matter.

FIG. 4 shows an example delayed sampling processing framework 400 according to the disclosed embodiment. In one or more embodiments, the framework 400 can receive, for example, hourly traffic information (i.e., aggregated traffic data reports) as an input 405 in graph form and, in a first layer 401, process the input 405 using an encoder/decoder neural network 410 to remove noise and complete gaps in the data, e.g., using the strategy described above to obtain a reconstructed graph $\hat{G}$. The first layer 410 of the framework 400 inputs the reconstructed graph $\hat{G}$ into a first graph convolution network (GCN) unit 415 and a first recurrent unit (RU) 420 (e.g., implemented as a long short term memory (LSTM) network or gated recurrent unit (GRU)) sequentially to disentangle the spatial and temporal relations. As will be discussed below, the framework 400 can process and use the feature vector output from these two units, which can be characterized as representing the input traffic information, for traffic flow prediction.

Generally, time-series data traffic information has different temporal granularities. The framework 400 handles varying temporal granularity by utilizing cascaded processing layers with delayed sampling. Concretely, delayed sampling caches data flow from a previous layer.

For example, in the implementation illustrated in FIG. 4 a daily flow delayed sampling unit 430 in a second layer 402 of the framework 400 caches hourly data twenty-four times (i.e., from the first GCN unit 415 and first RU 420 of the first layer 401) and samples from the accumulated information to obtain a cached input for a second layer 402 that includes a second GCN unit 435 and a second RU 440. Subsequently within the framework 400, a weekly flow delayed sampling cache 450 can cache data on a weekly basis and a third GCN unit 455 and third RU 460 can also be stacked to process the weekly cached data. The framework can easily be modified or extended to other temporal granularity by simply adjusting parameters in delayed sampling units. Thus, the framework 400 is able to capture high level trends in time-series traffic data.

The outputs from different processing layers 401, 402, 403, etc. can be connected or concatenated in respective fully connected layers 425, 445, and 465. The fully connected outputs can be fused at a fusion layer 470 to form a comprehensive feature vector. The traffic flow prediction system 100 can predict future traffic flow patterns in any of different, selected time horizons based on a supervised machine learning algorithm, such as by building a linear regression model based on the feature vector.

Accordingly, the disclosed traffic flow prediction system 100 can provided a traffic information prediction based on a hierarchical connected system that pervasively collects traffic data using a mixture of RSU and SRV, process the traffic data to model the traffic information it represents into a novel graph form, and utilize advanced machine learning-based techniques to denoise and complete the graph. The traffic flow prediction system 100 can further process the resultant denoised and completed data considering different temporal granularities by introducing the delayed sampling to allow for accurate traffic predictions on different time horizons.

Figure 5:
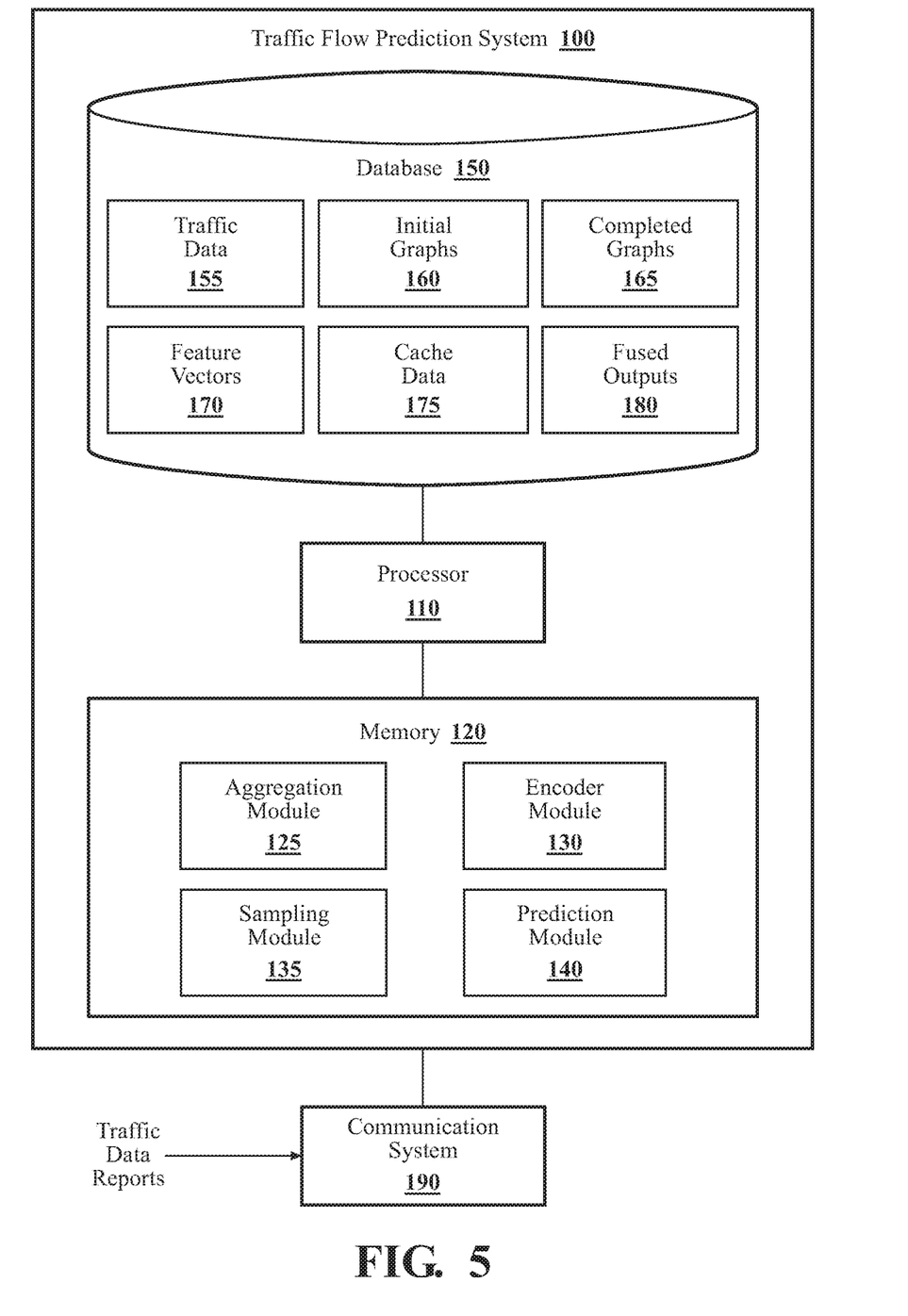
FIG. 5 illustrates an example a traffic flow prediction system according to the disclosed subject matter.

Referring to FIG. 5, one embodiment of a traffic flow prediction system 100 is illustrated. While arrangements will be described herein with respect to the traffic flow prediction system 100, it will be understood that embodiments are not limited to a unitary system as illustrated. In some implementations, the traffic flow prediction system 100 may be embodied as a cloud-computing system, a cluster-computing system, a cloud server, an edge sever, a distributed computing system (e.g., across multiple facilities), a software-as-a-service (SaaS) system, and so on. Accordingly, the traffic flow prediction system 100 is illustrated and discussed as a single system for purposes of discussion but should not be interpreted to limit the overall possible configurations in which the disclosed components may be configured. For example, the separate modules, memories, databases, and so on that will be discussed below may be distributed among various computing systems in varying combinations.

The traffic flow prediction system 100 is shown including various elements. It will be understood that in various embodiments and configurations depending on the actual layout and implementation, it may not be necessary for the traffic flow prediction system 100 to have all of the elements shown in FIG. 5. The traffic flow prediction system 100 can have any combination of the various elements shown in FIG. 5. Further, the traffic flow prediction system 100 can have additional elements to those shown in FIG. 5. In some arrangements, the traffic flow prediction system 100 may be implemented without one or more of the elements shown in FIG. 5. Further, while the various elements are shown as being located within the traffic flow prediction system 100 in FIG. 5, it will be understood that one or more of these elements can be located external to the traffic flow prediction system 100. In addition, the elements shown may be physically separated by large distances.

It will also be appreciated that for simplicity and clarity of illustration, where appropriate, reference numerals have been repeated among the different figures to indicate corresponding or analogous elements. The discussion outlines numerous specific details to provide a thorough understanding of the embodiments described herein. Those of skill in the art, however, will understand that the embodiments described herein may be practiced using various combinations of these elements.

In any case, the traffic flow prediction system 100 is implemented to perform methods and other functions as disclosed herein relating to collecting and processing traffic data to generate traffic flow predictions on different time horizons. The noted functions and methods to achieve this will become more apparent with a further discussion of the figures.

The traffic flow prediction system 100 is shown including a processor 110, a memory 120, database 150, and a communication system 190. In various implementations the processor 110 may be a part of the traffic flow prediction system 100, the traffic flow prediction system 100 may access the processor 110 through a data bus or another communication pathway, the processor 110 may be a remote computing resource accessible by the traffic flow prediction system 100, and so on. In any case, the processor 110 is an electronic device such as a microprocessor, an ASIC, or another computing component (or combination of computing components) that is capable of executing machine-readable instructions to produce various electronic outputs therefrom that may be used to control or cause the control of other electronic devices.

The traffic flow prediction system 100 includes a memory 120 that stores, for example, an aggregation module 125, an encoder module 130, a sampling module 135 and a prediction module 140. The memory 120 may store additional components as required per implementation. The memory 120 can be implemented as a random-access memory (RAM), read-only memory (ROM), a hard-disk drive, a flash memory, or other suitable memory for storing the modules 125, 130, 135 and 140.

The modules 125, 130, 135 and 140 are, for example, computer-readable instructions that when executed by the processor 110 cause the processor 110 to perform the various functions disclosed herein. In various embodiments, the modules 125, 130, 135 and 140 can be implemented in different forms that can include but are not limited to hardware logic, an ASIC, components of the processor 110, instructions embedded within an electronic memory, and so on. The modules 125, 130, 135 and 140 will be discussed in greater detail further below.

The traffic flow prediction system 100 includes a data store, which may be implemented as the database 150. The database 150 is, in one or more embodiments, an electronic data structure that can be a data store integral with the traffic flow prediction system 100, a removable memory device that can be installed in or removed from the traffic flow prediction system 100, or a network-based data store that is accessible to the modules 125, 130, 135 and 140 stored in the memory 120. In one or more embodiments the database 150 can be accessible to external systems, such as cloud or edge servers, vehicles, or road-side units. The database 150 is configured with routines that can be executed by the processor 110 for analyzing stored data, accessing and providing stored data, organizing stored data, and so on. Thus, in one embodiment, the database 150 stores and manages/updates data, such as traffic data 155, initial graphs 160, completed graphs 165, feature vectors 170, cache data 175 and fused outputs 180, as well as other types of data that are used by modules 125, 130, 135 and 140 in executing various functions.

The traffic flow prediction system 100 can also include a communication system 190 that allows the traffic flow prediction system 100 to receive traffic data reports and communicate with, for example, communication networks, SRVs, RSUs, mobile computing devices, and other systems, such as systems that may have data to contribute to the system 100 or may have a need for receiving traffic flow predictions. The communication system 190 can be implemented as, for example, a wireless communication system including one or more transmitting/receiving devices, one or more transmitting/receiving antennas and a controller for transmitting and receiving data over a wireless network using any of a variety of protocols, such as vehicle-to-everything (V2X), general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), Wibree, and/or any other wireless protocol.

In one or more embodiments, the communication system 190 can be configured to receive traffic data reports from a plurality of reporting sources (e.g., SRVs and RSUs, as discussed above), the traffic data being associated with roads in a geographic area and indicating reported information about the roads. In one or more embodiments the plurality of reporting sources include at least one SRV configured to transmit the traffic data only when the at least one SRV is approaching an intersection.

The modules 125, 130, 135 and 140 can be, for example, constructed as computer-readable instructions that when executed by the processor 110 cause the processor 110 to perform the various functions disclosed herein.

The aggregation module 125 generally includes instructions that function to control the processor 110 to form a plurality of initial graphs 160 each created by fusing the traffic data reports received over first lengths of time. For example, in one or more embodiments the aggregation module 125 can fuse traffic data reports 155 received over a first one hour period into a first initial graph, fuse traffic data reports 155 received over a subsequent second one hour period into a second initial graph, and so on.

In one or more embodiments, the plurality of initial graphs 160 each represent a plurality of road intersections defined as vertices, and each of a plurality of road links between the plurality of intersections are modeled as edges having edge attributes that indicate the reported information about the roads. In one or more embodiments, each of the plurality of initial graphs 160 is formulated as graph-structured data including a matrix G having dimensions N×k, where N is a total number of vertices, and k is a traffic data feature vector associated with each vertex, an adjacent data matrix A with the dimension N×N, where A is a binary matrix that contains directional information, and $A_{ij}=1$ represents vertex i connected with vertex j, and an edge matrix E, with dimensions N×N×l, that represents road link attributes including a length of the link, a speed limitation of the link, a maximum value of road curvature with dimension l, and an indicator of a traffic incident in the link. Accordingly, G, A and E describe traffic information, network information and geometry of the roads in the geographic area.

The encoder module 130 generally includes instructions that function to control the processor 110 to generate a plurality of completed graphs 165 based on the plurality of initial graphs 160 by at least removing noise from the plurality of initial graphs 160, and to generate a plurality of feature vectors 170 that represent spatial relationships and temporal relationships in the plurality of completed graphs 165.

In one or more embodiments, the encoder module 130 generates at least one completed graph of the plurality of completed graphs 165 by inputting an initial graph of the plurality of initial graphs 160 into a generative neural network model (e.g., generative neural network 300, FIG. 3) which, trained on ground truth data, encodes the initial graph by mapping it non-linearly from an original dimension space to a lower dimension latent space through a layered neural network, and then uses inverse decoding to re-project it back to the original dimension space as a completed graph.

In one or more embodiments, the encoder module 130 further generates at least one feature vector of the plurality of feature vectors 170 by inputting a complete graph of the plurality of complete graphs 165 into a graph convolutional network to obtain a spatial-relationships representation, inputting the spatial-relationships representation into a recurrent unit to obtain a temporal-relationships representation, and generating a feature vector based on the spatial-relationships representation and the temporal-relationships representation.

The sampling module 135 generally includes instructions that function to control the processor 110 to output a first feature vector of the plurality of feature vectors 170 corresponding to a first time window (e.g., one hour) as a first output, cache a copy of the first feature vector with a set of feature vectors of the plurality of feature vectors 170 corresponding to a second time window (e.g., twenty-four hours), connect the first feature vector with the set of feature vectors and output the result as a second output (e.g., as shown in the framework 400 of FIG. 4).

The prediction module 140 generally includes instructions that function to control the processor 110 to fuse the first output with the second output and generate a traffic prediction based on the fused outputs (e.g., as shown by the fusion 470 and prediction 475 in FIG. 4). In one or more embodiments, the prediction module generates the traffic prediction by building a linear regression model based on the fused outputs.

Figure 6:
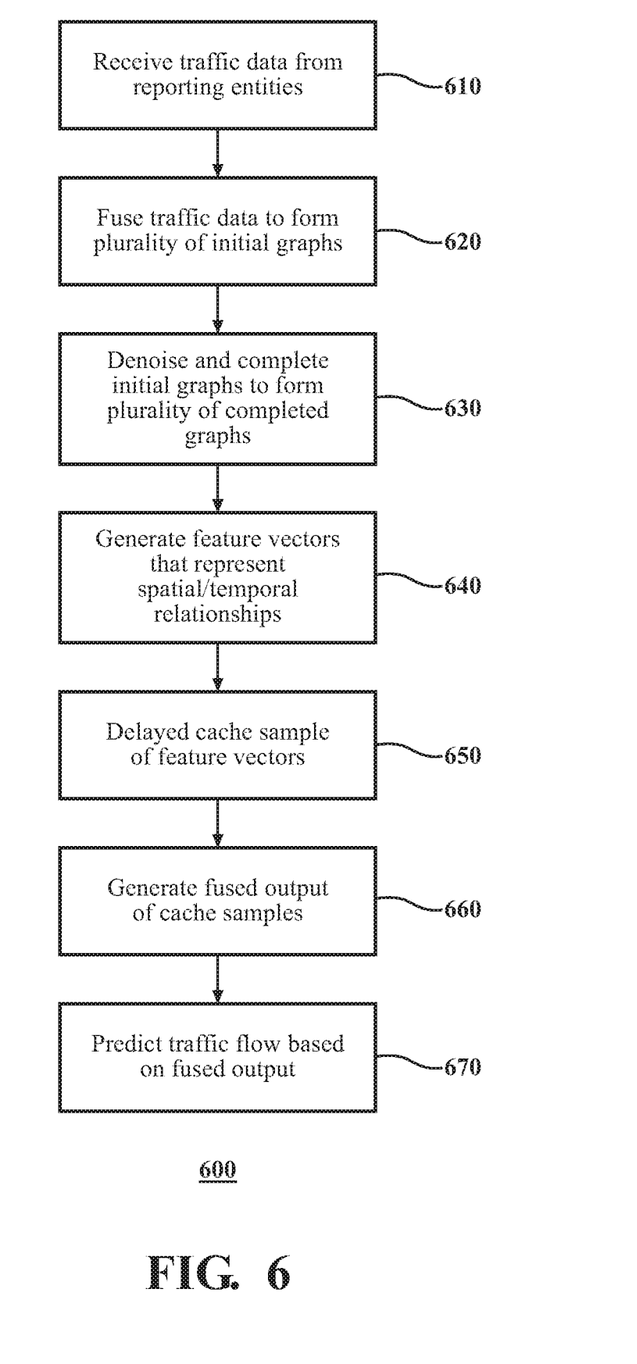
FIG. 6 illustrates a flowchart of a method associated with predicting traffic flow by the disclosed traffic flow prediction system according to the disclosed subject matter.

FIG. 6 illustrates a flowchart of a method 600 that is associated with predicting traffic flow by the disclosed traffic flow prediction system 100. The method 600 will be discussed from the perspective of the disclosed traffic flow prediction system 100 of FIG. 1. While the method 600 is discussed in combination with the system 100, it should be appreciated that the method 600 is not limited to being implemented within the system 100 but is merely one example of a system that may implement the method 600.

At operation 610, the traffic flow prediction system 100 (e.g., communication system 190) receives traffic data (e.g., transmitted reports) from a plurality of reporting sources (e.g., SRVs and RSUs). The traffic data can be associated with roads in a geographic area and indicate reported information about the roads.

At operation 620, the traffic flow prediction system 100 (e.g., aggregation module 125) can form a plurality of initial graphs by fusing the traffic data received over first lengths of time (e.g., received over an hour). In one or more embodiments the plurality of initial graphs each represent a plurality of road intersections defined as vertices, and each of a plurality of road links between the plurality of intersections are modeled as edges having edge attributes that indicate the reported information about the roads.

At operation 630, the traffic flow prediction system 100 (e.g., encoder module 130) can denoise and complete the plurality of initial graphs to form plurality of completed graphs. In one or more embodiments, the encoder module 130 can create a complete graph by inputting an initial graph into a generative neural network model which, trained on ground truth data, encodes the initial graph by mapping it non-linearly from an original dimension space to a lower dimension latent space through a layered neural network and then uses inverse decoding to re-project it back to the original dimension space as a completed graph.

At operation 640, the traffic flow prediction system 100 (e.g., encoder module 130) can generate feature vectors that represent separated spatial/temporal relationships. In one or more embodiments, the encoder module 130 can generate at least one feature vector by inputting a complete graph of the plurality of complete graphs into a graph convolutional network to obtain a spatial-relationships representation, inputting the spatial-relationships representation into a recurrent unit to obtain a temporal-relationships representation, and generating a feature vector based on the spatial-relationships representation and the temporal-relationships representation.

At operation 650, the traffic flow prediction system 100 (e.g., sampling module 135) can use delayed cache sampling to cache data (e.g., represented by the feature vectors) in one or more time frames (e.g., an hour, twenty-four hours, a week, etc.).

At operation 660, the traffic flow prediction system 100 (e.g., prediction module 140) can fuse cached data from one or more time frames to form a fused output.

At operation 670, the traffic flow prediction system 100 (e.g., prediction module 140) can generate a traffic prediction based on the fused output. For example, in one or more embodiments the prediction module 140 can generate the traffic prediction by building a linear regression model based on the fused outputs.

Thus, the disclosed traffic flow prediction system 100 can employ pervasive traffic information monitoring using a mixture of RSUs and SRVs, model traffic information in a novel graph-form, use an encoder/decoder machine learning algorithm to clean and complete the graph-form data, further process the clean and completed data to create a new feature vector by disentangling the spatial and temporal relations and considering different temporal granularities implemented by delayed sampling, fuse the results of the delayed sampling according to a desired prediction horizon and generate a traffic prediction based on the fused output.

In addition to the above described configurations, it should be appreciated that the traffic flow prediction system 100 from FIG. 1 can be configured in various arrangements with separate integrated circuits and/or chips. In such embodiments, the aggregation module 125, encoder module 130, sampling module 135 and prediction module 140, for example, can each be embodied on individual computing devices or integrated circuits. The circuits can be connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits. In another embodiment, the modules 125, 130, 135 and 140 may be combined into a separate application-specific integrated circuit. In further embodiments, portions of the functionality associated with the modules 125, 130, 135 and 140 may be embodied as firmware executable by a processor and stored in a non-transitory memory. In still further embodiments, the modules 125, 130, 135 and 140 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies (e.g., method 600 of FIG. 6) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The traffic flow prediction system 100 can include one or more processors 110. In one or more arrangements, the processor(s) 110 can be a main processor of the traffic flow prediction system 100. For instance, the processor(s) 110 can be an electronic control unit (ECU). The traffic flow prediction system 100 can include one or more data stores for storing one or more types of data. The data stores can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data stores can be a component of the processor(s) 110, or the data store can be operatively connected to the processor(s) 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or, more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A traffic flow prediction system, comprising:
a communication device configured to continually receive traffic data from a plurality of reporting sources, the traffic data being associated with roads in a geographic area and indicating reported information about the roads;
one or more processors; and
a memory communicably connected to the one or more processors and storing:
an aggregation module including one or more instructions that, when executed by the one or more processors, cause the one or more processors to form a plurality of initial graphs each created by fusing the traffic data received over first lengths of time;
an encoder module including one or more instructions that, when executed by the one or more processors, cause the one or more processors to generate a plurality of completed graphs based on the plurality of initial graphs by at least removing noise from the plurality of initial graphs, and to generate a plurality of feature vectors that represent spatial relationships and temporal relationships in the plurality of completed graphs; and
a sampling module including one or more instructions that, when executed by the one or more processors, cause the one or more processors to output a first feature vector of the plurality of feature vectors corresponding to a first time window as a first output, cache a copy of the first feature vector with a set of feature vectors of the plurality of feature vectors corresponding to a second time window, connect the first feature vector with the set of feature vectors and output a result as a second output, where the second time window is longer than the first time window; and
a prediction module including one or more instructions that, when executed by the one or more processors, cause the one or more processors to fuse the first output with the second output to produce fused outputs and generate a traffic prediction based on the fused outputs.

2. The traffic flow prediction system of claim 1, wherein the plurality of reporting sources include at least one multi-sensor vehicle configured to transmit the traffic data only when the at least one multi-sensor vehicle is approaching an intersection or pre-defined significant point.

3. The traffic flow prediction system of claim 1, wherein the plurality of initial graphs each represent a plurality of road intersections and predefined significant points defined as vertices, and each of a plurality of road links between the plurality of road intersections are modeled as edges having edge attributes that indicate the reported information about the roads.

4. The traffic flow prediction system of claim 3, wherein each of the plurality of initial graphs is formulated as graph-structured data including:
a matrix G having dimensions N×k, where N is a total number of vertices, and k is a traffic data feature vector associated with each vertex;
an adjacent matrix A with the dimension N×N, where A is a binary matrix that contains directional information, and $A_{ij}=1$ represents vertex i connected with vertex j; and
an edge matrix E, with dimensions N×N×l, that represents road link attributes including, for a given link, a length of the given link, a speed limitation of the given link, a maximum value of road curvature with dimension l, and an indicator of whether a traffic incident occurred in the given link,
such that G, A and E describe traffic information, network information and geometry of the roads in the geographic area.

5. The traffic flow prediction system of claim 1, wherein the encoder module includes instructions that cause the one or more processors to generate at least one completed graph of the plurality of completed graphs by:
inputting an initial graph of the plurality of initial graphs into a generative neural network model which, trained on ground truth data, encodes the initial graph by mapping the initial graph non-linearly from an original dimension space to a lower dimension latent space through a layered neural network and then using inverse decoding to re-project the initial graph back to the original dimension space as a completed graph.

6. The traffic flow prediction system of claim 1, wherein the encoder module includes instructions that cause the one or more processors to generate at least one feature vector of the plurality of feature vectors by:
inputting a completed graph of the plurality of completed graphs into a graph convolutional network to obtain a spatial-relationships representation;
inputting the spatial-relationships representation into a recurrent unit to obtain a temporal-relationships representation; and
generating a feature vector based on the spatial-relationships representation and the temporal-relationships representation.

7. The traffic flow prediction system of claim 1, wherein the prediction module includes instructions that cause the one or more processors to generate the traffic prediction by building a linear regression model based on the fused outputs.

8. A method of generating a traffic flow prediction, comprising:
receiving traffic data from a plurality of reporting sources, the traffic data being associated with roads in a geographic area and indicating reported information about the roads;
forming a plurality of initial graphs, each created by fusing the traffic data received over first lengths of time;
generating a plurality of completed graphs based on the plurality of initial graphs by at least removing noise from the plurality of initial graphs;
generating a plurality of feature vectors that represent spatial relationships and temporal relationships in the plurality of completed graphs;
outputting a first feature vector of the plurality of feature vectors corresponding to a first time window as a first output;
caching a copy of the first feature vector with a set of feature vectors of the plurality of feature vectors corresponding to a second time window;
connecting the first feature vector with the set of feature vectors;
outputting a result of the connecting as a second output, where the second time window is longer than the first time window;
fusing the first output with the second output to produce fused outputs; and
generating a traffic prediction based on the fused outputs.

9. The method of claim 8, wherein the plurality of reporting sources include at least one multi-sensor vehicle configured to transmit the traffic data only when the at least one multi-sensor vehicle is approaching an intersection predefined significant point.

10. The method of claim 8, wherein the plurality of initial graphs each represent a plurality of road intersections and predefined significant points defined as vertices, and each of a plurality of road links between the plurality of road intersections are modeled as edges having edge attributes that indicate the reported information about the roads.

11. The method of claim 10, wherein each of the plurality of initial graphs is formulated as graph-structured data including:
a matrix G having dimensions N×k, where N is a total number of vertices, and k is a traffic data feature vector associated with each vertex;
an adjacent matrix A with the dimension N×N, where A is a binary matrix that contains directional information, and $A_{ij}=1$ represents vertex i connected with vertex j; and
an edge matrix E, with dimensions N×N×l, that represents road link attributes including, for a given link, a length of the given link, a speed limitation of the given link, a maximum value of road curvature with dimension l, and an indicator of whether a traffic incident occurred in the given link,
such that G, A and E describe traffic information, network information and geometry of the roads in the geographic area.

12. The method of claim 8, wherein generating at least one completed graph of the plurality of completed graphs comprises:
inputting an initial graph of the plurality of initial graphs into a generative neural network model which, trained on ground truth data, encodes the initial graph by mapping the initial graph non-linearly from an original dimension space to a lower dimension latent space through a layered neural network and then using inverse decoding to re-project the initial graph back to the original dimension space as a completed graph.

13. The method of claim 8, wherein generating at least one feature vector of the plurality of feature vectors comprises:
inputting a completed graph of the plurality of completed graphs into a graph convolutional network to obtain a spatial-relationships representation;
inputting the spatial-relationships representation into a recurrent unit to obtain a temporal-relationships representation; and
generating a feature vector based on the spatial-relationships representation and the temporal-relationships representation.

14. The method of claim 8, generating the traffic prediction comprises building a linear regression model based on the fused outputs.

15. A non-transitory computer-readable medium for generating a traffic flow prediction and including instructions that when executed by one or more processors cause the one or more processors to:
receive traffic data from a plurality of reporting sources, the traffic data being associated with roads in a geographic area and indicating reported information about the roads;
form a plurality of initial graphs, each created by fusing the traffic data received over first lengths of time;
generate a plurality of completed graphs based on the plurality of initial graphs by at least removing noise from the plurality of initial graphs;
generate a plurality of feature vectors that represent spatial relationships and temporal relationships in the plurality of completed graphs;
output a first feature vector of the plurality of feature vectors corresponding to a first time window as a first output;
cache a copy of the first feature vector with a set of feature vectors of the plurality of feature vectors corresponding to a second time window;
connect the first feature vector with the set of feature vectors and output a result as a second output, where the second time window is longer than the first time window;
fuse the first output with the second output to produce fused outputs; and
generate a traffic prediction based on the fused outputs.

16. The non-transitory computer-readable medium of claim 15, wherein the plurality of reporting sources include at least one multi-sensor vehicle configured to transmit the traffic data only when the at least one multi-sensor vehicle is approaching an intersection or predefined significant point.

17. The non-transitory computer-readable medium of claim 15, wherein the plurality of initial graphs each represent a plurality of road intersections and pre-defined signification points defined as vertices, and each of a plurality of road links between the plurality of road intersections are modeled as edges having edge attributes that indicate the reported information about the roads.

18. The non-transitory computer-readable medium of claim 17, wherein each of the plurality of initial graphs is formulated as graph-structured data including:
a matrix G having dimensions N×k, where N is a total number of vertices, and k is a traffic data feature vector associated with each vertex;
an adjacent matrix A with the dimension N×N, where A is a binary matrix that contains directional information, and $A_{ij}=1$ represents vertex i connected with vertex j; and
an edge matrix E, with dimensions N×N×l, that represents road link attributes including, for a given link, a length of the given link, a speed limitation of the given link, a maximum value of road curvature with dimension l, and an indicator of whether a traffic incident occurred in the given link,
such that G, A and E describe traffic information, network information and geometry of the roads in the geographic area.

19. The non-transitory computer-readable medium of claim 15, further comprising instructions to generate at least one completed graph of the plurality of completed graphs by:
inputting an initial graph of the plurality of initial graphs into a generative neural network model which, trained on ground truth data, encodes the initial graph by mapping the initial graph non-linearly from an original dimension space to a lower dimension latent space through a layered neural network and then using inverse decoding to re-project the initial graph back to the original dimension space as a completed graph.

20. The non-transitory computer-readable medium of claim 15, wherein generating at least one feature vector of the plurality of feature vectors comprises:
inputting a completed graph of the plurality of completed graphs into a graph convolutional network to obtain a spatial-relationships representation;
inputting the spatial-relationships representation into a recurrent unit to obtain a temporal-relationships representation; and
generating a feature vector based on the spatial-relationships representation and the temporal-relationships representation.

* * * * *